United States Patent Office 3,652,577
Patented Mar. 28, 1972

3,652,577
CERTAIN 3-ALKYL-2-ALKYLIMINO-4-HALO-PHENYLTHIAZOLIDIN-4-OLS
Robert E. Manning, Mountain Lakes, N.J., assignor to Sandoz-Wander, Inc., Hanover, N.J.
No Drawing. Continuation-in-part of application Ser. No. 780,236, Nov. 29, 1968. This application July 28, 1969, Ser. No. 845,535
Int. Cl. C07d 91/16
U.S. Cl. 260—306.7    3 Claims

ABSTRACT OF THE DISCLOSURE

Substituted 2-alkyliminothiazolidinols, e.g., 4-p-chlorophenyl-3-methyl-2-methyliminothiazolidin-4-ol, are useful as anorexics, CNS stimulants and anti-inflammatory agents.

---

This application is a continuation-in-part of U.S. patent application Ser. No. 780,236, filed November 29, 1968, now abandoned.

This invention relates to novel heterocyclic compounds. More particularly, this invention pertains to novel 3-alkyl-2-alkylimino-4-substituted phenyl thiazolidin-4-ols, and to acid addition salts thereof. This invention also pertains to methods for preparing these compounds, to intermediates therefor, and to methods for the preparation of the intermediates.

The substituted thiazoles of the present invention may be represented by the following structural formula:

(I)

where each

R independently, is lower alkyl, i.e., alkyl having 1–4 carbon atoms, e.g. methyl, ethyl or isopropyl;

$R_1$ is H or straight chain lower alkyl having 1–3 carbon atoms, e.g., methyl, ethyl, or propyl; and each X independently, is H or halo having an atomic weight of about 19–36, provided at least one X is said halo.

These compounds of Formula I in acid addition salt form (Ia) may be prepared in accordance with the following reaction scheme:

(II)    (III)    (Ia)

where R, $R_1$ and X and the proviso are as defined above and $X_1$ represents halo of atomic weight about 35–80.

Accordingly, the compounds of Formula Ia above are prepared by treating a phenacyl bromide or chloride (II), e.g., p-chlorophenacyl-bromide, with an N,N'-dialkylthiourea (III) in solvent at a temperature of about 10° to 35° C. The solvents which may be used include acetone, lower alkanols such as ethanol, tetrahydrofuran and the like. The particular solvents and temperatures used are not critical.

In addition, compounds of Formula I or Ia may be prepared by treating a compound of the formula:

(IV)

with compounds respectively of the formula:

(V)    (Va)

in which X, $X_1$, R and $R_1$ and the proviso are as defined above.

This process may be carried out by reaction of a compound of Formula IV with a compound of Formula V or Va in inert solvent, such as ethers, e.g., diethyl ether or tetrahydrofuran, in inert atmosphere, for instance under nitrogen gas, at a temperature of about 0° to 50° C., preferably room temperature. The reaction may be conducted for about 3 to 24 hours. Neither the solvent nor temperature is critical.

Compounds (Ia) may be obtained directly by treating a compound of the formula:

(VI)

with a formamidine of the formula:

(VII)

in which X, $X_1$, R and $R_1$ and the proviso are as defined above.

Compounds (Ia) are prepared according to the above process by treating a compound of Formula VI with a compound of the Formula VII in inert solvent, for example, an alkanol having 1–4 carbon atoms, such as ethanol or isoproanol, at a temperature of about 10° to 40° C., conveniently around room temperature. The reaction may be performed for about 12 to 48 hours in order to obtain the product (I). Neither the solvent nor the temperature is critical.

Compounds (I) or (Ia) may also be obtained by treating respectively a compound of the formula:

(VIII)

or an acid addition salt thereof with activated manganese dioxide in which X, R and $R_1$ and the proviso are as defined above.

This process is conducted by treating a compound (VIII) or an acid addition salt thereof with activated manganese dioxide in halogenated hydrocarbon solvent such as $CHX_{13}$ or $CH_2X_{12}$ where $X_1$ is as earlier defined and is preferably chloro. The temperature of reaction may be about 0° to 35° C., preferably about 20° to 25° C., and it may be maintained for about 12–60 hours. Neither the solvent nor the temperature is critical.

As indicated above, the compounds of Formula I above may be recovered as their acid addition salts. When it is desired to convert such salts to the corresponding free bases, conventional techniques may be utilized, e.g., dissolution of the salt in water and precipitation using a base such as sodium carbonate.

The compounds of Formula I may also be illustrated by their tautomeric equivalents such as represented by the following structural formula:

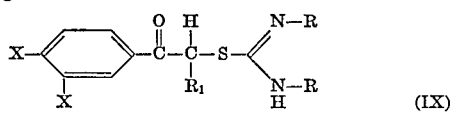

(IX)

where R, $R_1$, and X and the proviso are as previously defined.

In order to simplify this description, however, Formula I only will be used. It should be nevertheless understood that the compounds of Formula IX including the optical isomers, may be represented as well as the compounds of Formula I and both tautomeric forms and optical isomers are within the concept of the present invention.

The compounds of Formula IV are prepared by treating a compound of the formula:

(X)

with the en-thiol tautomer of compound (III) having the formula:

$$RN=\overset{SH}{\underset{}{C}}-NHR \quad (XI)$$

where R, $R_1$ and $X_1$ are as previously defined and $R_2$ is alkyl having 1 to 5 carbon atoms in alkanol solvent having 1 to 4 carbon atoms at about 50°–125° C., preferably at about 80°–110° C., and in the presence of an alkali metal (Na, K) carbonate or bicarbonate, for about 24–96 hours. The carbonate or bicarbonate is desired because it is converted to the corresponding metal halide during the reaction. Neither the solvent nor the reaction time is critical.

The compounds (VI) are prepared by reacting a compound of the formula:

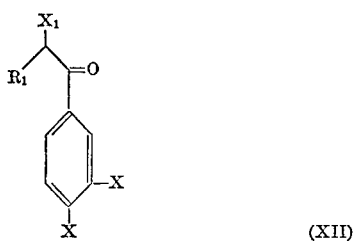

(XII)

where X, $X_1$, and $R_1$ and the proviso are as earlier defined, with an alkali metal hydrosulfide, e.g., the sodium or potassium hydrosulfide, in solvent such as dimethylformamide or dimethylacetamide, at a temperature of about 10° to 45° C., conveniently at room temperature, for about 12 to 48 hours. Neither the solvent nor the reaction temperature is critical.

Compounds (VIII) in the form of their HX salts are prepared by treating a compound of the formula:

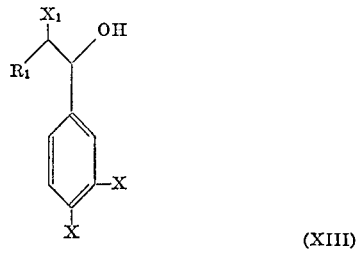

(XIII)

with a thiourea of Formula III, where X, $X_1$, and $R_1$ and the proviso are as earlier defined in alcohol of 1 to 4 carbons as solvent at about 10 to 40° C., conveniently at room temperature, for about 12 to 48 hours. Neither the solvent nor the temperature is critical.

Certain of the starting materials of Formulae II, III or XI, V, Va, VII, X, XII and XIII above are known and are known and are prepared by methods disclosed in the literature. Those not specifically disclosed are prepared from known materials in an analogous manner.

The compounds of Formula I are useful because they possess pharmacological activity in animals. More particularly, the compounds are useful as anorexics as indicated by their activity in rats given 25 mg./kg. of active material and tested by use of the free feeding method described by Randall et al. (JPET, 129, 163, 1960) whereby 16 groups of six male Wistar rats are deprived of food for 18 hours but receive water ad libitum. Consumption of ground food is then measured over a four hour period following oral administration of the active compound.

The compounds of Formula I also are useful as CNS stimulants, particularly as psychic stimulants, as indicated by their interaction with amphetamine sulfate in mice given 25–50 mg./kg. of active compound and 2.5 mg./kg. of amphetamine, i.p. The mice are placed in individual actophotometers and locomotor activity is measured over an 80 minute period at 10 minute intervals.

Compounds (I) are also useful as anti-inflammatory agents as indicated by their activity in rats given about 25 mg./kg. of active agent orally and tested using the acute carrageenan-induced edema procedure substantially as described by Winter (Proc. Soc. Exp. Biol., 111: 544, 1962).

These compounds of Formula I may, for all these uses, be administered in the form of their non-toxic pharmaceutically acceptable acid addition salts. Such salts possess the same order of activity as the free base, are readily prepared by reacting the base with an appropriate acid and accordingly are included within the scope of the invention. Representative of such salts are the mineral acid salts, such as the hydrochloride, hydrobromide, sulfate, phosphate and the like and the organic acid salts such as the succinate, benzoate, acetate, p-toluenesulfonate, benzenesulfonate and the like.

When so utilized, these compounds may be combined with a pharmaceutically acceptable carrier or adjuvant and may be administered orally or parenterally. For these uses, the dosage will vary depending upon the mode of administration utilized and the particular compound employed. In general, satisfactory results are obtained when the compounds are administered as anorexics or psychic stimulants at a daily dosage of from about 0.2 mg. to 25 mg./kg. of animal body weight. This daily dosage is preferably given in divided doses, e.g., 2 to 4 times a day, or in sustained release form. For most large mammals, the total daily dosage is from about 15 to 75 mg. and dosage forms suitable for interal administration comprise from about 3.75 mg. to about 37.5 mg. of the compound in admixture with a solid or liquid pharmaceutical carrier or diluent. When the compounds are to be administered as anti-inflammatories, satisfactory results are obtained at a daily dosage of from about 10–100 milligrams orally per kilogram of animal body weight, preferably given 2 to 4 times a day or in sustained release form. The total daily dosage for most large animals for this use is from about 150–750 mg. orally, and dosage forms suitable for intneral administration comprise from about 40–400 mg. of the compound in admixture with a solid or liquid pharmaceutical carrier or diluent.

A representative formulation suitable for oral administration is a tablet prepared by standard tabletting techniques which contains the following:

| Ingredients: | Parts by wt. |
|---|---|
| 4 - p - chlorophenyl - 3 - methyl-2-methylamino-thiazolidin-4-ol hydrobromide | 30 |
| Tragacanth | 2 |
| Lactose | 59.5 |
| Corn starch | 5 |
| Talcum | 3 |
| Magnesium stearate | 0.5 |

The following examples are provided for the purpose of illustration and not by way of limitation. They are not intended so as to limit the scope of the invention as defined in the appended claims.

EXAMPLE 1

4-p-chlorophenyl-3-methyl-2-methylimino-thiazolidin-4-ol hydrobromide

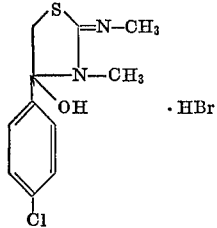

A solution of p-chlorophenacylbromide (9.3 g.) in acetone (50 ml.) is added with stirring at room temperature to a solution of N,N'-dimethylthiourea (4.1 g.) in acetone (100 ml.). After 1 hour, the solid is collected by filtration to give 4-p-chlorophenyl-3-methyl-2-methyl-iminothiazolidin-4-ol hydrobromide, which melts at 172° C., resolidifies, and remelts at 218°–220° C. with decomposition.

When the above process is carried out and 2,4'-dichlorobutyrophenone is used in place of p-chlorophenacylbromide, there is obtained 4-p-chlorophenyl-5-ethyl-3-methyl-2-methylimino thiazolidin - 4 - ol hydrobromide; M.P. 169°–170° C. which, when added to water and treated with sodium carbonate, provides 4-p-chlorophenyl-5-ethyl-3-methyl-2-methylimino thiazolidin-4-ol.

EXAMPLE 2

5-p-chlorophenyl-5-ethyl-3-methyl-2-methylimino-thiazolidin-4-ol hydrobromide

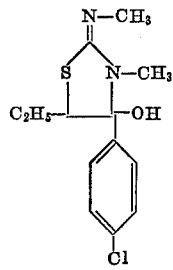

A mixture of 0.10 mole of ethyl-α-bromobutyrate, 0.10 mole of N,N'-dimethylthiourea, 0.10 mole of anhydrous potassium carbonate and 500 ml. of isopropanol are stirred and refluxed for 48 hours. The mixture is filtered and the filtrate concentrated in vacuo. The residue is crystallized from $CH_3OH:H_2O$ (2:1) to give 5-ethyl-3-methyl-2-methylimino-thiazolidin-4-one.

A solution of 0.10 mole of the above product in 500 ml. anhydrous tetrahydrofuran is added dropwise over 2 hours at room temperature to a stirred solution of 0.11 mole of p-chloro phenyl lithium in 500 ml. of tetrahydrofuran maintained under a nitrogen atmosphere. The mixture is stirred overnight at room temperature, cooled in an ice bath and treated with 50 ml. of saturated ammonium chloride solution. The solids are filtered off and the filtrate dried with magnesium sulfate, and then treated with a stream of anhydrous hydrogen bromide gas to give 4 - p - chlorophenyl - 5 - ethyl - 3 - methyl - 2 - methylimino-thiazolidin-4-ol hydrobromide.

The title compound is again obtained when 0.11 mole of p-chlorophenyl magnesium bromide is substituted for the p-chlorophenyl lithium of the above process. In this instance, the hydrobromide is obtained directly.

EXAMPLE 3

4-p-chlorophenyl-5-ethyl-3-methyl-2-methylimino-thiazolidin-4-ol hydrobromide

A mixture of 0.10 mole of 2-bromo-4'-chlorobutyrophenone, 0.20 mole of sodium hydrosulfide and 200 ml. of anhydrous dimethylformamide is stirred at room temperature for 24 hours. The solvent is removed in vacuo and the residue treated with 50 ml. of water and 200 ml. of chloroform. The chloroform is separated from the water layer, dried with magnesium sulfate, filtered and concentrated in vacuo to give with 2-mercapto-4'-chlorobutyrophenone as an oil. The crude ketone is added to 0.10 mole of bromoformamidine in 150 ml. of isopropanol and stirred at room temperature for 24 hours. The resultant solid is filtered to give 4-p-chlorophenyl-5-ethyl-3 - methyl - 2 - methylimino - thiazolidin - 4 - ol hydrobromide, M.P. 169°–170° C.

EXAMPLE 4

4-p-chlorophenyl-5-ethyl-3-methyl-2-methylimino-thiazolidin-4-ol hydrobromide

A mixture of 2-bromo-1-chlorophenyl butanol (0.10 mole) and N,N'-dimethylthiourea (0.10 mole) and 150 ml. of isopropanol is stirred at room temperature for 18 hours. The resultant solid is filtered off to give p-chloro-α - [1(N,N' - dimethylformamidinylthio)propyl]benzyl alcohol hydrobromide.

5 g. of the product is dissolved in 250 ml. of methylene chloride, and the solution is treated with 50 g. of activated manganese dioxide and stirred at room temperature for 32 hours. The manganese salts are filtered off and the filtrate concentrated in vacuo. The residue is crystallized from methanol to give 4-p-chlorophenyl-5-ethyl-3-methyl-2 - methylimino - thiazolidin - 4 - ol hydrobromide, M.P. 169°–170° C.

What is claimed is:
1. A compound of the formula:

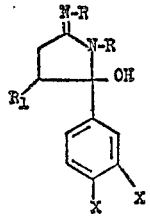

where

R is lower alkyl, $R_1$ is H or straight chain lower alkyl having 1 to 3 carbon atoms; and each X independently, is H fluoro or chloro, provided at least one X is said halo.

2. A compound according to claim 1 which is 4-p-chlorophenyl-3-methyl-2-methylimino thiazolidin-4-ol.

3. A compound according to claim 1 which is 4-p-chlorophenyl-5-ethyl-3-methyl-2-methylimino thiazolidin-4-ol.

References Cited

UNITED STATES PATENTS 3,455,924   7/1969   Lednicer   260—306.7

ALEX MAZEL, Primary Examiner

R. J. GALLAGHER, Assistant Examiner

U.S. Cl. X.R.

260—564 R, 590; 424—200, 270